May 1, 1934. J. A. MARCHNER 1,957,071
ANTIGLARE GOGGLES
Filed Aug. 13, 1932 2 Sheets-Sheet 1

INVENTOR
Joseph A. Marchner
BY
Frank Keifer
ATTORNEY

May 1, 1934. J. A. MARCHNER 1,957,071
ANTIGLARE GOGGLES
Filed Aug. 13, 1932  2 Sheets-Sheet 2

INVENTOR
Joseph A. Marchner
BY
Frank Keifer
ATTORNEY

Patented May 1, 1934

1,957,071

UNITED STATES PATENT OFFICE 1,957,071

ANTIGLARE GOGGLES

Joseph A. Marchner, Rochester, N. Y.

Application August 13, 1932, Serial No. 628,699

13 Claims. (Cl. 88—41)

The object of this invention is to provide a new and improved pair of spectacles or goggles which will shield the eyes from the glare of headlights of approaching automobiles at night.

Another object of the invention is to mount the lenses of the goggles so that they can be raised to horizontal position to uncover the eyes by a downward movement of the jaw, and locked in that position, and then can be unlocked or released by a further downward movement of the jaw after which they will automatically turn down to vertical position to cover the eyes, and all this is done without the use of the hands.

Another object of the invention is to mount the lenses of the goggles so that they can be rotated axially, and vary the shape of the darkened area thereof, so as to get different shading effects from them.

These and other objects of the invention will be illustrated in the drawings, described in the specification, and pointed out in the claims at the end thereof.

Figure 1:
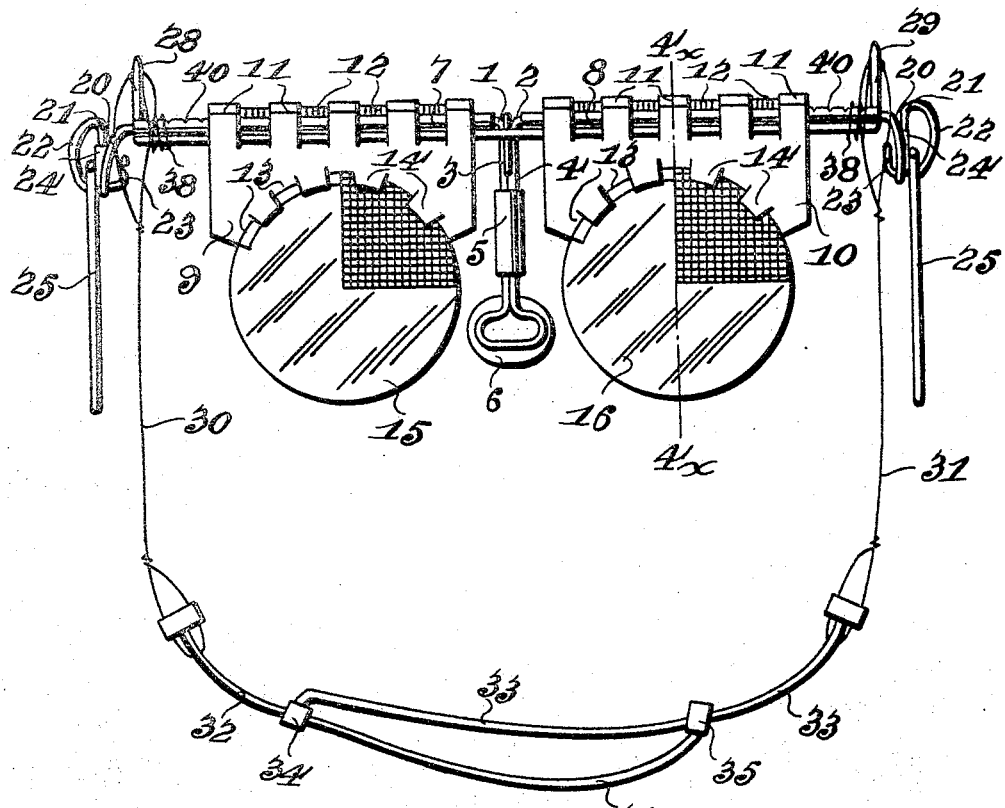
Figure 1 is a front elevation of the spectacles.

Figures 6 to 11, inclusive, are detail views of the lenses showing various modifications of the shaded portions of the lenses.

In the drawings like reference numerals indicate like parts.

In the drawings reference numerals 1 and 2 indicate the two halves of the bridge, which is formed of two pieces of wire having the downturned ends 3 and 4. These ends are engaged by one end of a sleeve 5. The other end of the sleeve engages with the nose-piece 6, which is formed of a wire bent to the shape shown, the two free ends of which engage in the other end of the sleeve. The nose-piece 6 is adjustable up and down in the sleeve, and in this way the length of the nose-piece can be varied. The sleeve 5 holds the two sections of the bridge together, and in line with each other.

On the sections of the bridge are carried the sleeves 7 and 8, which sleeves are mounted to turn on the bridge. On the sleeves are carried the plates 9 and 10. These plates have a straight upper edge and a concave lower edge, and the odd numbered teeth 11, 11 formed thereby are bent to engage one side of the sleeve, and the even numbered teeth 12, 12 are bent to engage the other side of the sleeve. The lower edge of these two plates are slit with radial slits, and the odd numbered teeth 13, 13 are adapted to engage with one side of the lenses 15 and 16, and the even numbered teeth 14, 14 are adapted to engage with the other side of the lenses, so that between these teeth the lenses are held firmly in position on the plates, and in the correct angular position.

Figure 5:
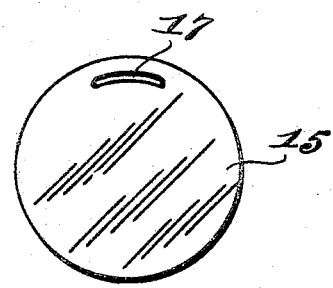
Figure 5 is a rear elevation of one of the lenses, or a blank therefor, showing a short groove that is provided in all of the lenses.
Figure 4:
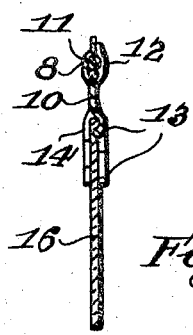
Figure 4 is a vertical section on the line 4x—4x of Figure 1.
Figure 6:
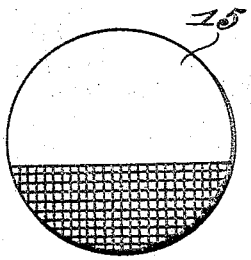
Figure 7:
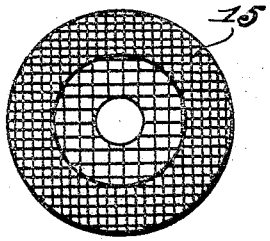
Figure 8:
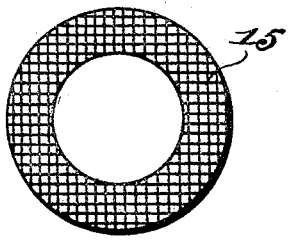
Figure 9:
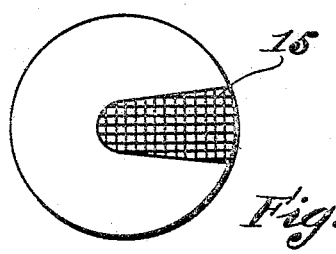

All of the lenses are provided with a short curved groove 17, as indicated in Figure 5. One or more of the teeth 13 engage in this groove and hold the lens in the correct angular position. The lenses 15 and 16 can be rotated so as to engage any of the teeth 13 in the groove 17.

In Figures 1, 6, 7, 8, 9, 10 and 11 I have shown various modifications of the shaded portions of the lenses so that various effects can be secured by assembling particular lenses with the frames, as may be desired.

It will be understood that these lenses may be varied in many other ways as well, and that the various lenses can all be used with the frames, as above described.

Figure 2:
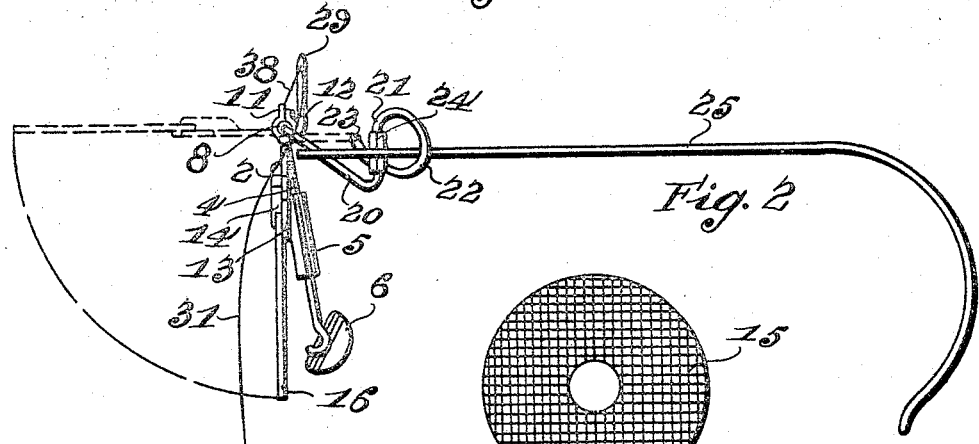
Figure 2 is a side elevation of the spectacles.
Figure 11:
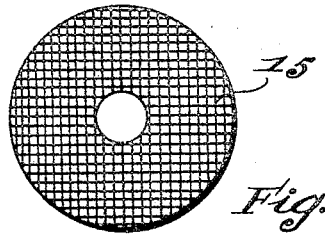
Figure 10:
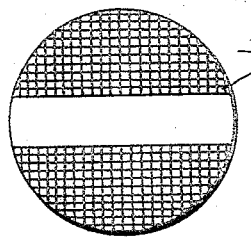
Figure 3:
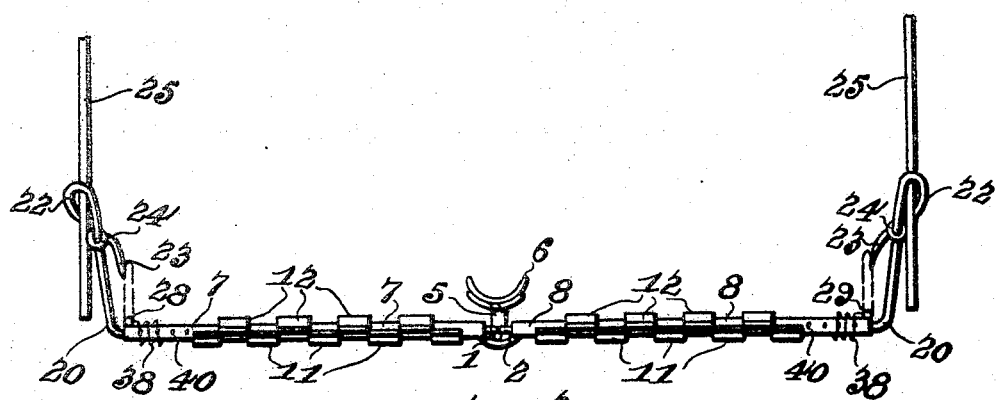
Figure 3 is a top plan view of the spectacles.

On the outer ends of the bridge, a bracket is formed by bending the wire ends of the bridge to the form shown. As shown in Figure 2, each end of the bridge 20 is bent down and back, and then is bent up, as indicated at 21, and is then bent out over the straight end of the hook as shown at 22, and is then bent up under the hook and the upturned end 23 is finished by tapering to an edge, a part of which edge is turned over to form a hook or shoulder for a purpose which will presently be described.

On the upturned portion 21 of the bracket is carried a sleeve 24, on which is carried the hooks 25, 25 which pass back and engage over the ears, which hooks can be folded up parallel to the bridge.

On the outer end of each of the sleeves 7 and 8 is provided an arm 28 and 29 integral therewith, which arms are placed 180 degrees or thereabouts from the plates 9 and 10. Each of these arms has a small hole in the outer end thereof, with which wire links 30 and 31 engage, which links engage with the sections 32 and 33 of a strap that passes under the jaw. The end of each strap makes sliding engagement with the other strap by a sleeve or loop 34 and 35, so that the strap can be adjusted to fit closely under the chin. When the lenses are in position to cover the eyes, they can be drawn up and forward to horizontal position by merely moving the lower jaw down, and in this horizontal position they are held aloft by a device that will be described as follows.

As the lenses swing up and forward, the arms 28 and 29 swing down and back and engage with the inside of the upturned ends 23. As they engage, they pass under the hook or shoulder that is formed on the upturned end, which locks them in the raised position, all of which is done by the movement of the jaw. Before the lenses can be lowered, they must be swung up somewhat further until the arms 28 and 29 pass below the upturned ends 23. The upturned ends 23 have sufficient spring in them, which causes them to spring inwardly out to the other side of the arms 28 and 29, after which the lenses can be swung down and the arms 28 and 29 will move up, passing outside of or engaging with the outside of the upturned ends 23, 23 which are left smooth so that the arms 28 and 29 will pass by them or slide over them freely, or without obstruction, to the raised position shown in Figure 2.

To move the lenses positively to a vertical position in front of the eyes and hold them in that position, I provide torsion springs 38, 38, one end of each of which engages the sleeves 7 and 8, and the other end of which engages in the hole in the arms 28 and 29. These springs are set to normally hold the lenses in a vertical position before the eyes. The springs give when the lenses are raised to a horizontal position, and as soon as the lenses are released by being raised by a further downward movement of the jaw, the springs operate to throw the lenses into a vertical position in front of the eyes.

On the outer ends of the sleeves 8 and 9 I provide a series of notches or recesses 40, 40 which are marks that are used to position the sleeves in or out along the bridge, so that the sleeves and the lenses which they carry can be equally spaced from the center of the bridge.

The lenses are preferably merely flat pieces of glass with color applied thereto in any suitable way. The horizontal and vertical lines on the lenses in the various figures show the position and the density of the coloring matter, by which the passage of light is obstructed or diminished.

I claim:

1. A spectacle having a frame by which it is adapted to be supported, sleeves mounted to turn thereon, a pair of lenses, plates engaging said sleeves with their upper edge and engaging said lenses with their lower edge, said lenses and plates being adapted to swing from vertical to horizontal position on said frame, an arm on each of said sleeves by which the sleeve can be turned, a strap having the ends attached to said arms, said arms, sleeves and lenses being adapted to rock on the frame on the downward movement of the strap.

2. A spectacle having a frame by which it is adapted to be supported, sleeves mounted to turn thereon, a pair of lenses, plates engaging said sleeves with their upper edge and engaging said lenses with their lower edge, said plates having their upper and lower edges slit to form teeth, which teeth engage the opposite sides of the sleeves and lenses.

3. A spectacle having a frame by which it is adapted to be supported, sleeves mounted to turn thereon, a pair of lenses, plates engaging said sleeves with their upper edge and engaging said lenses with their lower edge, said lenses and plates being adapted to swing from vertical to horizontal position on said frame, a bracket formed on each of the outer ends of said frame, said bracket extending rearwardly and up from the frame, a hook mounted to swing on the upwardly extending part of each bracket.

4. A spectacle having a frame by which it is adapted to be supported, sleeves mounted to turn thereon, a pair of lenses, plates engaging said sleeves with their upper edge and engaging said lenses with their lower edge, said lenses and plates being adapted to swing from vertical to horizontal position on said frame, a bracket formed on each of the outer ends of said frame, a hook mounted to swing on each bracket, the end of each of said brackets being bent down and forward and up, an arm on each of said sleeves that is adapted to rock therewith and engage the end of the bracket and hold the sleeves with the plates and lenses in horizontal position.

5. A spectacle having a frame by which it is adapted to be supported, sleeves mounted to turn thereon, a pair of lenses, plates engaging said sleeves with their upper edge and engaging said lenses with their lower edge, said lenses and plates being adapted to swing from vertical to horizontal position on said frame, a bracket formed on each of the outer ends of said frame, a hook mounted to swing on each bracket, the end of each of said brackets being bent down and forward and up, an arm on each of said sleeves that is adapted to rock therewith and engage the end of the bracket and hold the sleeves with the plates and lenses in horizontal position, means for raising the lenses to horizontal position, said means being operable to raise the lenses further than horizontal position to release them, a spring for returning the lenses to vertical position.

6. A spectacle having a frame by which it is adapted to be supported, sleeves mounted to turn thereon, a pair of lenses, plates engaging said sleeves with their upper edge and engaging said lenses with their lower edge, said plates having their upper and lower edges slit to form teeth, which teeth engage the opposite sides of the sleeves and lenses, each of said lenses having a curved groove therein with which one of said teeth is adapted to engage for the purpose of holding the lenses positively in position.

7. A spectacle having a frame, lenses mounted thereon, a curved groove in said lenses concentric with the center thereof, means for engaging said groove to support said lenses, and permit adjustment thereof within the length of said groove, said lenses having a light and shaded portion therein, said adjustment permitting the shaded portion to be moved into and out of line with the vision.

8. A spectacle having a frame by which it is adapted to be supported, sleeves mounted to turn thereon, a pair of lenses, plates engaging said sleeves with their upper edge and engaging said lenses with their lower edge, said plate having their upper and lower edges slit to form teeth, which teeth engage the opposite sides of the sleeves and lenses, each of said lenses having a curved groove therein with which one of said teeth is adapted to engage for the purpose of holding the lenses positively in position, each of said lenses having a light and shaded portion therein that can be adjusted relative to said frame by the rotation of the lenses.

9. A spectacle having a frame by which it is adapted to be supported, sleeves mounted to turn thereon, lenses supported on said sleeves, a wire crosspiece connecting said sleeves and rigidly fastened thereto, said wire crosspiece having upwardly extending arms at each end thereof, straps forming a loop fastened to said arms.

10. A spectacle having a frame by which it is adapted to be supported, sleeves mounted to turn thereon, lenses supported on said sleeves, a wire crosspiece connecting said sleeves and rigidly fastened thereto, said wire crosspiece having upwardly extending arms at each end thereof, straps forming a loop fastened to said arms, said sleeves being capable of swinging said lenses from a vertical position to a horizontal position by the downward movement of said straps.

11. A spectacle having a frame by which it is adapted to be supported, sleeves mounted to turn thereon, lenses supported on said sleeves, a wire crosspiece connecting said sleeves and rigidly fastened thereto, said wire crosspiece having upwardly extending arms, said sleeves being capable of swinging said lenses from a vertical position to a horizontal position by the downward movement of said straps, means for locking said lenses in horizontal position.

12. A spectacle having a frame by which it is adapted to be supported, sleeves mounted to turn thereon, lenses supported on said sleeves, a wire crosspiece connecting said sleeves and rigidly fastened thereto, said wire crosspiece having upwardly extending arms, said sleeves being capable of swinging said lenses from a vertical position to a horizontal position by the downward movement of said straps, means for locking said lenses in horizontal position, said lenses being capable of returning to vertical position by a further downward movement of said straps.

13. A spectacle having a frame by which it is adapted to be supported, sleeves mounted to turn thereon, lenses supported on said sleeves, a wire crosspiece connecting said sleeves and rigidly fastened thereto, said wire crosspiece having upwardly extending arms at each end thereof, straps forming a loop fastened to said arms, said straps being fastened to each other by a knot capable of sliding upon the opposite strap to permit the adjustment of said loop.

JOSEPH A. MARCHNER.